(12) United States Patent
Picconi et al.

(10) Patent No.: US 9,130,918 B2
(45) Date of Patent: Sep. 8, 2015

(54) SYSTEM AND METHOD FOR AUTOMATICALLY VERIFYING STORAGE OF REDUNDANT CONTENTS INTO COMMUNICATION EQUIPMENTS, BY DATA COMPARISON

(75) Inventors: Fabio Picconi, Paris (FR); Matteo Varvello, Middletown, NJ (US); Christophe Diot, Paris (FR)

(73) Assignee: THOMSON LICENSING, Issy les Moulineaux (FR)

( * ) Notice: Subject to any disclaimer, the term of this patent is extended or adjusted under 35 U.S.C. 154(b) by 271 days.

(21) Appl. No.: 13/497,284

(22) PCT Filed: Sep. 15, 2010

(86) PCT No.: PCT/EP2010/063555
§ 371 (c)(1),
(2), (4) Date: Mar. 18, 2013

(87) PCT Pub. No.: WO2011/032987
PCT Pub. Date: Mar. 24, 2011

(65) Prior Publication Data
US 2013/0173920 A1    Jul. 4, 2013

(30) Foreign Application Priority Data
Sep. 21, 2009   (EP) .................................... 09305880

(51) Int. Cl.
*G06F 21/00*    (2013.01)
*H04L 29/06*    (2006.01)
(Continued)

(52) U.S. Cl.
CPC *H04L 63/08* (2013.01); *H04L 9/28* (2013.01); *H04L 67/104* (2013.01)

(58) Field of Classification Search
CPC .................................................. H04L 67/2819
USPC ........................................................ 713/168
See application file for complete search history.

(56) References Cited

U.S. PATENT DOCUMENTS 7,979,909 B2 * 7/2011 Jancula et al. .................. 726/26
8,205,240 B2 * 6/2012 Ansari et al. ...................... 726/1
(Continued)

FOREIGN PATENT DOCUMENTS

CA    2256936      6/2000
CA    2432573      12/2003
(Continued)

OTHER PUBLICATIONS

"Proceeding of the 5$^{th}$ Symposium on Operating Systems Design and Implementation", Cox et al., Boston, MA, Dec. 9-11, 2002.*
(Continued)

*Primary Examiner* — Morshed Mehedi
(74) *Attorney, Agent, or Firm* — Tutunjian & Bitetto, P.C.

(57) ABSTRACT

A method is intended for verifying storage of contents into communication equipments connected to at least one communication network. This method consists, when a first communication equipment stores a content and wants to verify that this content is still stored into a second communication equipment: i) in transmitting a first request, comprising at least an identifier of this content and first data representative of this content and requiring verification of the storage of this content into the second communication equipment, to an auxiliary communication equipment acting as an interface between the communication network and the second communication equipment, ii) in transmitting a second request, comprising at least the content identifier, to the second communication equipment, to require transmission of second data representative of the content to the auxiliary communication equipment, and in triggering a timeout having a chosen duration, and iii) if the auxiliary communication equipment has received the second data before expiration of this timeout, in comparing these received second data, possibly after having processed them, to the received first data, and in transmitting a message representative of the result of this comparison to the first communication equipment.

24 Claims, 1 Drawing Sheet

(51) Int. Cl.
*H04L 9/28* (2006.01)
*H04L 29/08* (2006.01)

(56) References Cited

U.S. PATENT DOCUMENTS

| | | | |
|---|---|---|---|
| 2003/0236894 A1 | 12/2003 | Herley | |
| 2004/0044774 A1* | 3/2004 | Mangalik et al. | 709/227 |
| 2004/0228279 A1 | 11/2004 | Midtun et al. | |
| 2004/0260927 A1 | 12/2004 | Grobman | |
| 2005/0203973 A1* | 9/2005 | Yagawa | 707/204 |
| 2005/0240591 A1 | 10/2005 | Marceau et al. | |
| 2006/0075063 A1 | 4/2006 | Grosse et al. | |
| 2006/0107036 A1 | 5/2006 | Randle et al. | |
| 2006/0176836 A1 | 8/2006 | Jennings, III et al. | |
| 2006/0212703 A1* | 9/2006 | Kojima | 713/175 |
| 2006/0248337 A1 | 11/2006 | Koodli | |
| 2007/0088801 A1* | 4/2007 | Levkovitz et al. | 709/217 |
| 2007/0220160 A1 | 9/2007 | Seidel | |
| 2007/0226781 A1 | 9/2007 | Chen et al. | |
| 2007/0288638 A1 | 12/2007 | Vuong et al. | |
| 2007/0294422 A1 | 12/2007 | Zuckerman et al. | |
| 2008/0141321 A1 | 6/2008 | Kubat et al. | |
| 2008/0281982 A1 | 11/2008 | Yanagihara et al. | |
| 2010/0287609 A1* | 11/2010 | Gonzalez et al. | 726/14 |
| 2011/0022242 A1* | 1/2011 | Bukhin et al. | 700/291 |
| 2011/0219229 A1* | 9/2011 | Cholas et al. | 713/168 |
| 2012/0094643 A1* | 4/2012 | Brisebois et al. | 455/418 |
| 2012/0136945 A1* | 5/2012 | Lee et al. | 709/206 |

FOREIGN PATENT DOCUMENTS

| | | |
|---|---|---|
| CA | 2492986 | 1/2004 |
| CA | 2587759 | 11/2007 |
| CN | 1694492 | 11/2005 |
| CN | 1815960 | 8/2006 |
| EP | 2302536 | 3/2011 |
| JP | 2004127189 | 4/2004 |
| JP | 2006121209 | 5/2006 |
| JP | 2006174359 | 6/2006 |
| JP | 2007034545 | 2/2007 |
| WO | WO99/57847 | 11/1999 |
| WO | WO02/065329 | 8/2002 |
| WO | WO2006/001916 | 1/2006 |
| WO | WO2007/083531 | 7/2007 |
| WO | WO2008/012488 | 1/2008 |
| WO | WO2008/016442 | 2/2008 |
| WO | WO2008/065348 | 6/2008 |

OTHER PUBLICATIONS

Cox et al: "Pastiche: making backup cheap and easy", 5th Symposium on Operating Systems Design and Implementation, USENIX Ass , vol. 36, No. SI, Dec. 9, 2002, pp. 285-298.
Search Report dated Nov. 5, 2010.
Aiyer, A. et al., "BAR Fault Tolerance for Cooperative Services", SOSP '05, Oct. 2005. (14 pages).
Ateniese, G. et al., "Provable Data Possession at Untrusted Stores", CCS '07, Oct. 2007, pp. 598-610.
Castro, M. et al., "Practical Byzantine Fault Tolerance and Proactive Recovery", ACM Transactions on Computer Systems, vol. 20, No. 4, Nov. 2002, pp. 398-461.
Chun, B. et al., "Attested Append-Only Memory: Making Adversaries Stick to their Word", SOSP '07, Oct. 2007. (16 pages).
Garfinkel, T. et al., "Flexible OS Support and Applications for Trusted Computing", In the 9th Hot Topics in Operating Systems (HOTOS-IX), 2003. (6 pages).
Haeberlen, A. et al., "PeerReview: Practical Accountability for Distributed Systems", SOSP '07, Oct. 2007. (14 pages).
Kamvar, S. et al., "The EigenTrust Algorithm for Reputation Management in P2P Networks", WWW '03 Proceedings of the 12th international conference on World Wide Web, May 2003, pp. 640-651.
Kumar, R. et al., "Peer-Assisted File Distribution: The Minimum Distribution Time", IEEE 2006. (11 pages).
Lin, Y. et al., "kP2PADM: An In-kernel Gateway Architecture for Managing P2P Traffic", IEEE 2007. (9 pages).
Morselli, R. et al., "Trust-Preserving Set Operations", Proceedings of INFOCOM, 2004, pp. 2231-2241.
Ngan, T. et al., "Enforcing Fair Sharing of Peer-to-Peer Resources", Lecture Notes in Computer Science, vol. 2735, 2003, pp. 149-159.
Patro, S. et al., "Transparent Query Caching in Peer-to-Peer Overlay Networks", IPDPS '03, Apr. 2003. (10 pages).
Sun, Q. et al., "SLIC: A Selfish Link-based Incentive Mechanism for Unstructured Peer-to-Peer Networks", 24th International Conference on Distributed Computing Systems, Mar. 2004, pp. 506-515.
Wang, X., "A Secure Admission Control Scheme for P2P Networks", 2006 International Conference on Wireless Communications, Networking and Mobile Computing, 2006. (4 pages).

\* cited by examiner

SYSTEM AND METHOD FOR AUTOMATICALLY VERIFYING STORAGE OF REDUNDANT CONTENTS INTO COMMUNICATION EQUIPMENTS, BY DATA COMPARISON

This application claims the benefit, under 35 U.S.C. §365 of International Application PCT/EP2010/063555, filed Sep. 15, 2010, which was published in accordance with PCT Article 21(2) on Mar. 24, 2011 in English and which claims the benefit of European patent application No. 09305880.8, filed Sep. 21, 2009.

TECHNICAL FIELD

The present invention relates to the domain of distributed content storage by communication equipments connected to at least one communication network, and more precisely to auditing of content that are (or should be) stored into communication equipments.

One means here by "content" any type of digital information that can be transmitted through a communication network of the wired or wireless type, possibly in a peer-to-peer (or P2P) mode. So it is a group of digital data which may constitute a message (whatever the type) or at least a part of a video, file, television program, radio program or software update, for instance.

BACKGROUND OF THE INVENTION

Distributed storage is an interesting way of storing contents, notably, but not exclusively, in a P2P environment. It consists in storing redundant contents into different communication equipments of users, which agree to let at the disposal of other users a portion of their storage space. So, it offers a good resilience to failures because it minimizes the probability of irrecoverable content loss in case of a disk crash.

However, distributed storage must face several security issues. Indeed, unlike servers, whose softwares work in a highly secured environment, user softwares (and notably P2P one) run on communication equipment, such as home computers or laptops, and therefore may be easily tampered with or modified. Modified user softwares may deviate from normal behavior, and therefore may cause damage to other users, such as content losses, for instance. Effectively, a user may attempt to free ride his distributed storage environment by installing a modified client application that allows him to erase other users' content from his local storage disk, while falsely reporting that they are still present. In this situation the owner of a content finds out that this content has been erased when he tries to retrieve his content, and if no other copy of this content is available, then this content is irrecoverably lost.

Some distributed storage audit mechanisms have been proposed to allow content storage verification (or audit or else possession challenge).

Some of them consist in authorizing untrusted users (or peers) to audit themselves. This is notably the case of the mechanism described in the document of T.-W. J. Ngan et al., "Enforcing fair sharing of peer-to-peer resources", in Proc. of IPTPS, 2003. These mechanisms employ randomization techniques to limit the effects of a small number of colluding nodes, however they are still vulnerable to bribery attacks, and notably those of large groups of colluding nodes.

Some other mechanisms rely on sophisticated cryptographic techniques to prove content possession. This is notably the case of the mechanism described in the document of G. Ateniese et al., "Provable Data Possesion at Untrusted Stores", in Proc. of CCS, 2007. These mechanisms require more computing power than other mechanisms, and they generate some storage overhead. Moreover, these mechanisms are also vulnerable to colluding nodes.

SUMMARY OF THE INVENTION

So the object of this invention is to improve the situation.

For this purpose, the invention provides a method, intended for verifying storage of contents into communication equipments connected to at least one communication network, and comprising the steps of, when a first communication equipment stores a content and has to verify that this content is still stored into a second communication equipment:

i) transmitting a first request, comprising at least an identifier of this content and first data representative of this content and requiring verification of the storage of this content into second communication equipment, to an auxiliary communication equipment acting as an interface between the communication network and this second communication equipment, ii) transmitting a second request, comprising at least this content identifier, to the second communication equipment, to require transmission of second data representative of the content to this auxiliary communication equipment, and triggering a timeout having a chosen duration, and iii) if this auxiliary communication equipment has received the second data before expiration of the timeout, comparing these received second data, possibly after having processed them, to the received first data, and transmitting a message representative of the result of this comparison to the first communication equipment.

The method according to the invention may include additional characteristics considered separately or combined, and notably:

in step i) the first request may comprise first data arranged into data blocks of a chosen size and may further comprise this chosen data block size, in step ii) the second request may further comprise the chosen data block size in order the second data be arranged into blocks of this chosen size, and in step iii) the comparison may be carried out on each data block of the chosen size;

in step i) the transmitted first data may result from application of a chosen cryptographic function to at least a chosen part of at least some of the primary data defining the content, and in step iii), before proceeding to the comparison, one may apply the chosen cryptographic function to the received second data to produce processed data, and then one may compare these processed data to the first data;

in step i) the first request may further comprise a value defining offsets between each first data block and a chosen data block acting as a reference, in step ii) the second request may further comprise these received offset values, and in step iii) one may apply the chosen cryptographic function to the received second data, arranged into data blocks of the chosen size and which correspond to the received offset values, to produce processed data blocks, and then one may compare these processed data blocks to the first data blocks;

the chosen cryptographic function may be a hash function;

in a variant of step i) the transmitted first data may be at least some of the primary data defining the content;

in step ii) the timeout may be chosen in order to be smaller than an estimation of the minimal time which would be necessary to the second communication equipment for downloading the content from a third communication equipment and then transmitting this downloaded content arranged into second data to the auxiliary communication equipment;

this minimal time estimation may depend on the type of the communication link between the second communication equipment and the auxiliary communication equipment and the type(s) of the communication link between the auxiliary communication equipment and the communication network.

The invention also provides a system, intended for verifying storage of contents into communication equipments connected to at least one communication network, and comprising:

interrogation means arranged, when a first communication equipment, to which it is associated, stores a content and wants to verify that this content is still stored into a second communication equipment, for generating a first request, comprising at least an identifier of this content and first data representative of this content and requiring verification of the storage of this content into the second communication equipment, and intended to be transmitted to an auxiliary communication equipment acting as an interface between the communication network and the second communication equipment, and processing means arranged, when the auxiliary communication equipment, to which it is associated, has received said first request, for generating a second request, intended to be transmitted to the second communication equipment, comprising at least the content identifier and requiring transmission of second data representative of this content to the auxiliary communication equipment, and for triggering a timeout having a chosen duration, and, if the auxiliary communication equipment has received this second data before expiration of said timeout, for comparing the received second data, possibly after having processed them, to the received first data, and for generating a message representative of the result of this comparison and intended to be transmitted to the first communication equipment.

The system according to the invention may include additional characteristics considered separately or combined, and notably:

its interrogation means may be arranged for generating a first request comprising first data arranged into data blocks of a chosen size and further comprising this chosen data block size, and its processing means may be arranged for generating a second request further comprising this chosen data block size in order the second data be arranged into blocks of this chosen size, and for proceeding to comparison on each data block of this chosen size;

its interrogation means may be arranged for generating a first request comprising first data resulting from application of a chosen cryptographic function to at least a chosen part of at least some of the primary data defining the content, and its processing means may be arranged, before proceeding to the comparison, for applying this chosen cryptographic function to the received second data to produce processed data, and then for comparing these processed data to the first data;

its interrogation means may be arranged for generating a first request further comprising a value defining offsets between each first data block and a chosen data block acting as a reference, and its processing means may be arranged for generating a second request further comprising the received offset values, and for applying the chosen cryptographic function to the received second data, arranged into data blocks of this chosen size and corresponding to the received offset values, to produce processed data blocks, and then for comparing these processed data blocks to the first data blocks;

in a variant, the first data may be at least some of the primary data defining the content;

its processing means may be arranged for using a timeout which is chosen in order to be smaller than an estimation of the minimal time which would be necessary to the second communication equipment for downloading the content from a third communication equipment and then transmitting this downloaded content arranged into second data to the auxiliary communication equipment.

The invention is well fitted, but not exclusively, to peer-to-peer environments in which the communication equipments constitute peers.

BRIEF DESCRIPTION OF THE FIGURES

Other features and advantages of the invention will become apparent on examining the detailed specifications hereafter and the appended drawings, wherein.

DETAILED DESCRIPTION OF THE PREFERRED EMBODIMENT

The appended drawings may serve not only to complete the invention, but also to contribute to its definition, if need be.

The invention aims at offering a method, and an associated system (S), intended for allowing users (i) of communication equipments (CEi) to verify if their distributed contents are still stored into communication equipments (CEi' (i'≠i)) of other users (i') that are connected to at least one communication network (CN).

In the following description it will be considered that the communication network(s) (CN) is (are) wired (or fixed) network(s), such as DSL network(s) or optical fiber network(s) or else cable network(s), which is (are) preferably connected to the Internet. But the invention is not limited to this type of communication network. Indeed, a communication network may be also a wireless communication network, such as a mobile or cellular or else radio communication network.

Moreover in the following description it will be considered that the communication equipments (CEi) exchange contents therebetween in a peer-to-peer (or P2P) mode. So, the user communication equipments (CEi) constitute peers that are connected therebetween through communication network(s) (CN). But the invention is not limited to this mode of content exchange.

Figure 1:
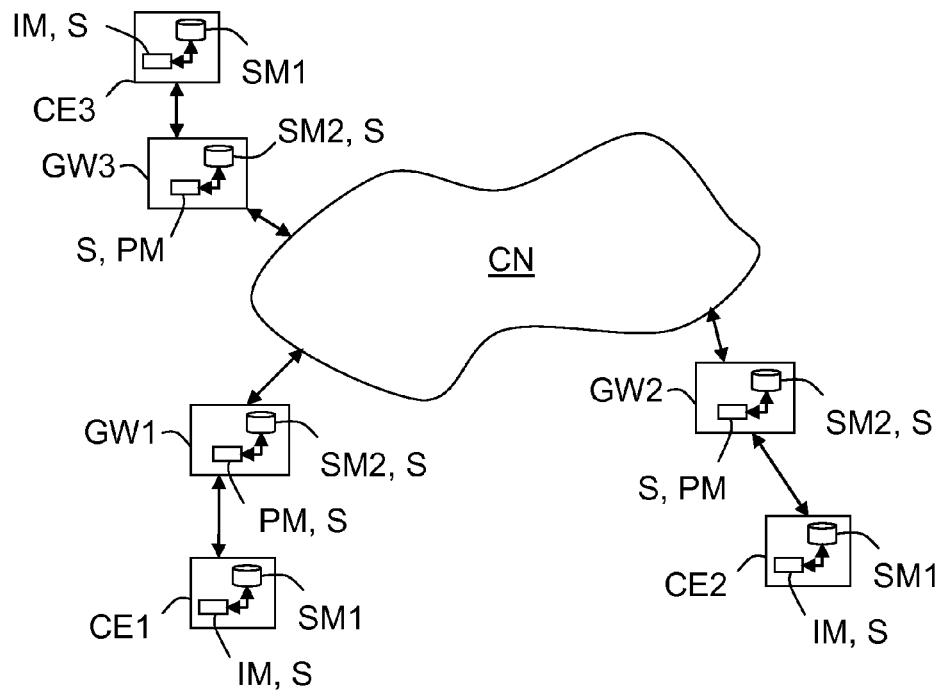
FIG. 1 schematically and functionally illustrates a communication network to which are connected three communication equipments, comprising a first part of a system according to the invention, through three home gateways comprising a second part of this system according to the invention.

As it is schematically illustrated in FIG. 1, the invention concerns distributed content storage between at least two communication equipments CEi that are each connected to a communication network CN through an auxiliary communication equipment GWi. In this non limiting example three communication equipments CEi (i=1 to 3) are connected to a single communication network CN. But the number of communication equipments CEi may be smaller than three (i.e. equal to two) or greater than three. Moreover, these communication equipments CEi could be connected to different communication networks. More, several communication equipments CEi may be connected to a communication network through the same auxiliary communication equipment GWi.

In the following description it will be considered that the communication equipments CEi are computers or laptops. But the invention is not limited to this type of communication equipment. Indeed, a communication equipment may be also a content receiver (for instance a home gateway or a set-top box (STB) located in the user's home premise), a mobile or cellular telephone, a fixed telephone, or a personal digital assistant (PDA), provided that it comprises a communication modem (or any equivalent communication means) and a storage capacity (or space) allowing storage of contents of other communication equipments.

Moreover, in the following description it will be considered that the auxiliary communication equipments GWi are home gateways. Home gateways are interesting communication equipments offering three characteristics which can be advantageously exploited by the invention: 1) they can act as a trusted third party because their firmware and execution environment are generally controlled by an Internet service provider (or ISP), and therefore it is assumed that auditors cannot collude with auditees, 2) they are supposed to be widely spread, and therefore may allow content audits of a large number of communication equipments, and 3) they communicate with their associated communication equipments through local links (for instance of the Wi-Fi type), and therefore enable audits which generate very little network traffic (for instance Internet traffic). The invention is not limited to the above mentioned type of auxiliary communication equipment. Indeed, the invention concerns any type of auxiliary communication equipment acting as an interface between a communication network CN and at least one communication equipment CEi.

More, in the following description it will be considered that the contents to be audited (or verified) are files. But the invention is not limited to this type of content. Indeed, the invention concerns any type of content and notably contents constituting messages (whatever the type) or at least parts of videos, television programs, radio programs or software updates, for instance.

The invention proposes a method intended for verifying storage of contents into communication equipments CEi.

This method comprises three main steps and can be implemented by a distributed system S according to the invention. Such a system S comprises at least interrogating modules (or means) IM that are associated respectively to the communication equipments CEi, and processing modules (or means) PM that are associated respectively to the auxiliary communication equipments (here home gateways) GWi, which are themselves associated respectively to the communication equipments CEi.

One means here by "associated" the fact that an interrogating module IM or a processing module PM equips a communication equipment CEi or an auxiliary communication equipment GWi (as illustrated in FIG. 1). But in a variant it could also mean coupled (for instance connected) to a communication equipment CEi or an auxiliary communication equipment GWi.

A first main step (i) of the method according to the invention is implemented each time the user of a first communication equipment CEi (for instance CE1), which stores a content F (here a file), wants to verify that this file F is still stored into at least one second communication equipment CEi' (for instance CE2).

The first main step (i) consists of transmitting a first request, which comprises at least an identifier I(F) of a content F and first data representative of this content F, to an auxiliary communication equipment GW2 (here a home gateway) which acts as an interface between the communication network CN and a second communication equipment CE2 (which is supposed to store this content F), in order to require verification of the storage of this content F into this second communication equipment CE2.

The first main step (i) may be implemented by the interrogating module IM of the system S, which is associated to the first communication equipment CE1 whose user wants to proceed to the audit (or possession challenge or else verification) of file F. So, when the user of a first communication equipment CE1 decides to audit his file F into a second communication equipment CE2, he informs his first communication equipment CE1 of his decision and his first communication equipment CE1 informs its associated interrogation module IM in order it initiates this file audit by means of a first request.

Figure 2:
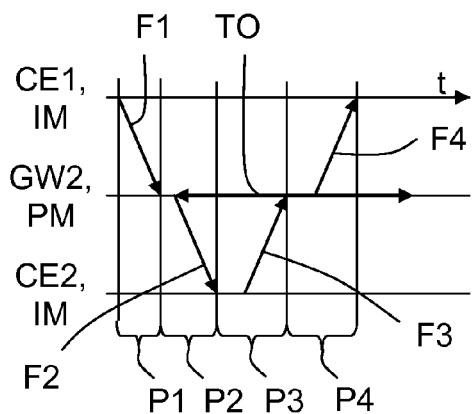
FIG. 2 is a temporal diagram illustrating successive phases of an example of embodiment of a process according to the invention, in case where a second communication equipment effectively stores an audited content.

The generation of a first request and the transmission of this first request to a home gateway GW2, respectively by an interrogation module IM and an associated first communication equipment CE1, occur during the phase P1, which is illustrated in the temporal diagram of FIG. 2, and are materialized by arrow F1 in FIG. 2. In FIG. 2, reference t designates the time.

For instance, the first data, which are contained into a first request, may be arranged into data blocks of a chosen size S. In this case, the first request further comprises this chosen data block size S.

It is important to note that the number of first data blocks is not necessarily equal to the number of data blocks defining the audited content F. Indeed, a first request may only comprise a selection of n data blocks of the audited content F.

For instance, the first data may result from the application of a chosen cryptographic function H to at least a chosen part of at least some of the primary data defining the content F to be audited. For instance, this chosen cryptographic function H may be of a hash type. In this case the first data are hash values. But any other cryptographic function, known from the man skilled in the art, may be used.

The first data may be produced by the first communication equipment CE1 from the primary data which define the content F to be audited and which are stored into a first storing means SM1 it comprises, and then transmitted to the associated interrogation module IM. But in a variant they could be produced by the interrogation module IM from the primary data which define the content F to be audited and which are stored into the first storing means SM1.

Each first storing means SM1 may be of any type known by the man skilled in the art. So, it may be a memory or a database.

It is important to note that a first request may further comprise values defining position offsets between its first data blocks and a chosen data block which acts as a reference in content F when it is arranged into data blocks. This reference is preferably the first data block of content F. This embodiment allows a first request to comprise only a selection of n first data blocks but not all the data blocks defining an audited content F.

In a variant, the first data, which are contained into a first request, may be at least some of the primary data which define the content F to be audited. In case where the first request contains only a selection of primary data, these selected primary data must be accompanied with their respective offsets.

A second main step (ii) of the method according to the invention occurs when phase P1 is finished, i.e. when the home gateway GWi (here GW2) receives a first request. This second main step (ii) takes place during phase P2 illustrated in FIG. 2.

When a home gateway GWi (here GW2) receives a first request it transmits it to its associated processing module PM. The latter (PM) extracts the information it contains and then stores each first data block, possibly in correspondence with its associated offset. This storage may be performed into a second storing means SM2, which is located into the home gateway GW2 and which may be part of the system S (or of the home gateway GW2).

Each second storing means SM2 may be of any type known by the man skilled in the art. So, it may be a memory or a database.

Once the processing module PM has stored at least the first data (or first data blocks), the second main step (ii) goes on with the transmission of a second request, comprising at least the received content identifier I(F), to the concerned second communication equipment CE2. This second request is intended for requiring transmission to the home gateway GW2, by the second communication equipment CE2, of second data which are representative of the content F (designated by its identifier I(F)). Once the second request has been locally generated, or approximately during this local generation, a timeout TO of a chosen duration is triggered.

The timeout TO may be chosen by the concerned processing module PM in order to be smaller than an estimation of the minimal time which would be necessary to the second communication equipment CE2 i) for downloading (retrieving) the audited content F from a third communication equipment CE3 (acting as a colluding node) and then ii) for transmitting this downloaded content (arranged into second data) to the concerned home gateway GW2.

It is important to note that the minimal time estimation may be computed by the concerned processing module PM (it is assumed that home gateway GWi can estimate their link bandwidths) or it may be fixed and predefined. This estimation of the minimal time may depend on the type of the communication link between the second communication equipment CE2 and the associated home gateway GW2 (it is for instance a Wi-Fi link) and the type(s) of the communication link between this associated home gateway GW2 and the communication network CN (it is for instance a DSL link).

It is also assumed that the local area network (LAN) bandwidth, which is available between a communication equipment CEi and its associated home gateway GWi, is significantly higher than the bandwidth at which this communication equipment CEi can download data from a distant communication equipment CEi' (for instance via the communication network CN and possibly the Internet). This assumption holds in the great majority of residential connections: the typical Internet downstream bandwidth is generally comprised between 1 and 10 Mbit/s (in the case of an ADSL link), while the bandwidth between a communication equipment CEi and its associated home gateway GWi is generally comprised between 50 and 100 Mbit/s (in the case of a Wi-Fi or Ethernet link).

The duration of the timeout TO depends on the amount of data to be audited (i.e. the size of the blocks and/or the number of blocks).

A second main step (ii) may be implemented by the processing module PM of the system S, which is associated to the home gateway GW2 which is the addressee of the first request generated by the interrogating module IM. So, when a processing module PM has generated a second request, it transmits it to its associated home gateway GW2 in order the latter (GW2) transmits it to the concerned second communication equipment CE2.

The generation of a second request and the transmission of this second request to a second communication equipment CE2, respectively by a processing module PM and its associated home gateway GW2, occur during phase P2, illustrated in FIG. 2, and are materialized by arrow F2 in FIG. 2.

It is important to note that the content of a second request depends on the content of the associated first request. Indeed, if the first request contains only a content identifier I(F) and first data, then the corresponding second request will only contain this content identifier I(F). If the first request contains a content identifier I(F), a first data block size S and first data, possibly associated to offsets, then the corresponding second request will contain this content identifier I(F), this first data block size S and these possible offsets (which define a selection of data blocks of the audited content F).

Once the second communication equipment CE2 has received a second request, it transmits it to its associated interrogation means IM. The latter (IM) checks if the local second storing means SM2 stores the audited content F designated into the received second request.

In the affirmative the interrogation means IM determines into the stored content F the second data which have been designated into the received first request (for instance by the possible offsets and/or possible data block size S). Then the interrogation means IM generates a message comprising the required second data and transmits this message to its associated second communication equipment CE2 in order it could be transmitted to its associated home gateway GW2. All these operations occur in the phase P3 illustrated in FIG. 2. The message transmission is materialized by arrow F3 in FIG. 2.

In the negative (i.e. when the second communication equipment CE2 has erased the audited content F from its second storing means SM2), the interrogation module IM may generate a message indicating that its associated second communication equipment CE2 does not store anymore the audited content F. This message is then transmitted by its associated second communication equipment CE2 to the associated home gateway GW2, during phase P3.

Figure 3:
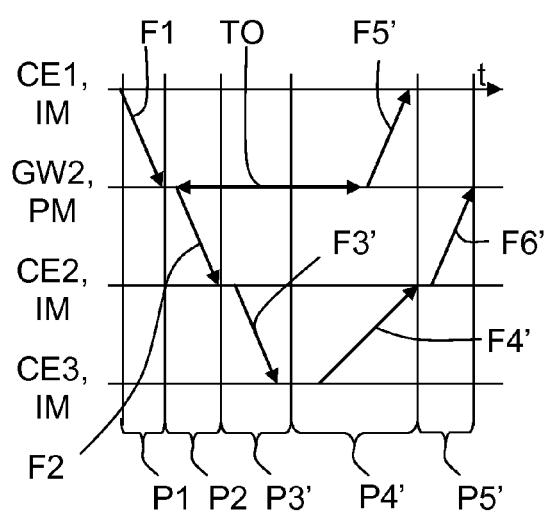
FIG. 3 is a temporal diagram illustrating successive phases of an example of embodiment of a process according to the invention, in case where a second communication equipment tries to download an audited content, that it was supposed to store, from a third communication equipment.

In a variant, schematically illustrated in FIG. 3, the interrogation module IM may try to retrieve the audited content F from a third communication equipment CE3 which still stores it. So, in a phase P3' the interrogation module IM orders to its associated second communication equipment CE2 to transmit a third request to the third communication equipment CE3 (arrow F3). Then in a phase P4 the third communication equipment CE3 transmits a message comprising a copy of the required part of content F to the second communication equipment CE2 (arrow F4'). Then in a phase P6' the interrogation means IM of the second communication equipment CE2 generates a message comprising the required second data and transmits this message to its associated second communication equipment CE2 in order it could be transmitted to its associated home gateway GW2 (arrow F6').

In this variant the time needed by the second communication equipment CE2 to retrieve and transmit the required part of content F is equal to the sum of the durations of phases P3', P4' and P6', which is at least equal to the minimal time above mentioned. In this example, this duration sum is greater than the timeout TO.

A third main step (iii) of the method according to the invention occurs when phase P3 is finished (i.e. when the home gateway GWi (here GW2) receives a message from the audited second communication equipment CE2) or when the timeout TO has expired while the home gateway GWi (here GW2) has not yet received a message from the audited second communication equipment CE2. This third main step (iii) takes place during phase P4 (or P4' in the variant) illustrated in FIG. 2.

A third main step (iii) may be implemented by the processing module PM of the system S, which has generated the second request.

If the home gateway GW2 has received the required second data before expiration of the timeout TO, its associated processing means PM compares these received second data, possibly after having processed them, to the corresponding first data (stored into the local second storing means SM2).

The processing means PM must process the received second data if the corresponding first data, previously received and stored in the local second storing means SM2, are data resulting from the application of the chosen cryptographic function H to at least a chosen part of at least some of the primary data defining the audited content F. In this case, the processing means PM applies the chosen cryptographic function to the received second data in order to produce processed data and then compares these processed data to the first data (stored in the local second storing means SM2).

The comparison is carried out on each data block of the chosen size S (when the first data are arranged into blocks).

If all second data (or all processed data obtained from second data) are identical to corresponding first data then the processing module PM considers that the second communication equipment CE2 stores the audited content F. Then the processing means PM generates a message indicating the situation (i.e. positive verification) and orders to its associated home gateway GW2 to transmit it to the first communication equipment CE1 during phase P4 (arrow F4).

If one or more second data (or processed data obtained from second data) are not identical to corresponding first data then the processing module PM considers that the second communication equipment CE2 does not store the audited content F. Then the processing means PM generates a message indicating the situation (i.e. negative verification) and orders to its associated home gateway GW2 to transmit it to the first communication equipment CE1 during phase P4 (arrow F4).

If the home gateway GW2 has not received the required second data before expiration of the timeout TO (as illustrated in FIG. 3), its associated processing means PM generates a message indicating the situation (I.e. no verification) and orders to its associated home gateway GW2 to transmit it to the first communication equipment CE1 during phase P4' (arrow F5'). If the home gateway GW2 receives the required second data after expiration of the timeout TO (here during phase P5'—arrow F6'), these second data are not taken into account and the home gateway GW2 may consider that the second CE2 and third communications equipments are colluding nodes. For instance it may broadcast this information to other users or to a dedicated manager.

The interrogation modules IM and/or the processing modules PM are preferably made of software modules, at least partly. But they could be also made of electronic circuit(s) or hardware modules, or a combination of hardware and software modules (in this case they must comprise also a software interface allowing interworking between the hardware and software modules). In case where they are exclusively made of software modules they can be stored in a memory of a communication equipment CEi or of an auxiliary communication equipment GWi or in any computer software product.

The invention offers several advantages, and notably:
it tolerates any number of colluding computers,
it generates a very small network traffic,
it requires little computing power,
it does not generate any storage overhead.

The invention is not limited to the embodiments of method and system described above, only as examples, but it encompasses all alternative embodiments which may be considered by one skilled in the art within the scope of the claims hereafter.

The invention claimed is:

1. A method for verifying storage of content in communication equipment connected to at least one communication network, the method comprising:
   i) receiving a first request at an auxiliary equipment acting as an interface between said communication network and a second communication equipment, said first request comprising at least an identifier of said content and first data representative of said content, and requesting verification of the storage of said content in said second communication equipment, said first request being transmitted from a first communication equipment
   ii) transmitting a second request, comprising at least said content identifier, from the auxiliary communication equipment to said second communication equipment, to request transmission of second data representative of said content to said auxiliary communication equipment, and to trigger a timeout of a chosen duration, and
   iii) in the case where said auxiliary communication equipment has received said second data before expiration of said timeout, comparing said received second data in the auxiliary communication equipment said to said received first data, and in the case where the second data is identical to the corresponding first data, then transmitting a message representative of the result of said comparison to said first communication equipment and indicating that the second equipment stores the content,
and in the case where the second data is not identical to the corresponding first data, then transmitting a message representative of the result of said comparison to said first communication equipment and indicating that the second equipment does not store the content.

2. The method according to claim 1 further comprising, in the case where said auxiliary communication equipment has not received said second data before expiration of said timeout, transmitting a message to said first communication equipment and indicating that no verification was performed.

3. The method according to claim 1, wherein said first request comprises first data arranged into data blocks of a chosen size and further comprises said chosen data block size, said second request further comprises said chosen data block size such that said second data be arranged into blocks of said chosen size, and said comparison is carried out on each data block of said chosen size.

4. The method according to claim 1, wherein said transmitted first data results from the application of a chosen cryptographic function to at least a chosen part of at least some primary data defining said content, and before proceeding to said comparison applying said chosen cryptographic function to said received second data to produce processed data and then comparing said processed data to said first data.

5. The method according to claim 2, wherein said first request further comprises a value defining offsets between each first data block and a chosen data block acting as a reference, said second request further comprises said received offset values, and applying said chosen cryptographic function to said received second data, arranged into data blocks of said chosen size and which corresponds to said received offset values, to produce processed data blocks and then comparing said processed data blocks to said first data blocks.

6. The method according to claim 3, wherein said chosen cryptographic function comprises a hash function.

7. The method according to claim 1, wherein said transmitted first data comprise at least some of primary data defining said content.

8. The method according to claim 1, wherein said timeout is chosen in order to be smaller than an estimation of the minimal time which would be necessary to said second communication equipment for downloading said content from a third communication equipment and then transmitting said downloaded content arranged into second data to said auxiliary communication equipment.

9. The method according to claim 7, wherein said minimal time estimation depends on the type of the communication link between said second communication equipment and said auxiliary communication equipment and the type(s) of the communication link between said auxiliary communication equipment and said communication network.

10. A system for verifying storage of content into communication equipment connected to at least one communication network, wherein the system comprises:
  i) an interrogator configured to, when a first communication equipment, with which the interrogator is associated, stores a content and wants to verify that the content is still stored into a second communication equipment, generate a first request, comprising at least an identifier of said content and first data representative of said content, said first request requesting verification of the storage of said content in said second communication equipment, and intended to be transmitted to an auxiliary communication equipment acting as an interface between said communication network and said second communication equipment, and
  ii) a hardware processor configured to trigger a timeout having a chosen duration, when said auxiliary communication equipment, with which the processor is associated, has received said first request to generate a second request, intended to be transmitted to said second communication equipment, comprising at least said content identifier and requiring transmission of second data representative of said content to said auxiliary communication equipment, and
  if said auxiliary communication equipment has received said second data before expiration of said timeout, to compare said received second data, to said received first data, and to generate a message representative of the result of said comparison and intended to be transmitted to said first communication equipment indicating if the auxiliary communication equipment stores the content.

11. The system according to claim 10, wherein said interrogator is configured to generate the first request comprising first data arranged into data blocks of a chosen size and further comprising a chosen data block size, and said processor is further configured to generate a second request further comprising said chosen data block size in order said second data be arranged into blocks of said chosen size, and to proceed to perform comparison on each data block of said chosen size.

12. The system according to claim 10, wherein said interrogator is further configured to generate the first request comprising first data resulting from application of a chosen cryptographic function to at least a chosen part of at least some of primary data defining said content, and said processor is further configured, before proceeding to said comparison, to apply said chosen cryptographic function to said received second data to produce processed data, and then to compare said processed data to said first data.

13. The system according to claim 12, wherein said interrogator is further configured to generate the first request further comprising a value defining offsets between each first data block and a chosen data block acting as a reference, and said processor is further configured to generate the second request further comprising said received offset values, and to apply said chosen cryptographic function to said received second data, arranged into data blocks of said chosen size and corresponding to said received offset values, to produce processed data blocks, and then to compare said processed data blocks to said first data blocks.

14. The system according to claim 10, wherein said first data comprise at least some of primary data defining said content.

15. The system according to claim 10, wherein said processor is further configured to use a timeout which is chosen in order to be smaller than an estimation of the minimal time which would be necessary to said second communication equipment for downloading said content from a third communication equipment and then transmit said downloaded content arranged into second data to said auxiliary communication equipment.

16. Use of the method according to claim 1 in a peer-to-peer environment in which said communication equipment constitute peers.

17. A system for verifying storage of content in communication equipment connected to at least one communication network, the system comprising:
  a hardware processor configured to trigger a timeout of a predetermined duration, when an auxiliary communication equipment connected to the at least one communication network and with which the processor is associated, has received a first request from a first communication equipment to verify content is still stored in a second communication equipment and to generate a second request;
  wherein if said auxiliary communication equipment has received second data in response to said second request and before expiration of said timeout, the processor compares said received second data to received first data, and generates a message representative of the result of said comparison and intended to be transmitted to the first communication equipment indicating if the second communication equipment connected to the at least one communication network stores the content.

18. The system according to claim 17, wherein the first request comprises at least an identifier of said content and the first data being representative of said content and which requires verification of the storage of said content in said second communication equipment, said first request being intended to be transmitted to the auxiliary communication equipment acting as an interface between said communication network and said second communication equipment.

19. The system according to claim 17, wherein the second request, intended to be transmitted to said second communication equipment, comprises at least said content identifier and requiring transmission of second data representative of said content to said auxiliary communication equipment.

20. The system according to claim 17, wherein the first request comprises first data arranged into data blocks of a chosen size and further comprising a chosen data block size, and said processor is further configured to generate the second request comprising said chosen data block size such that said second data be arranged into blocks of said chosen size, and to perform comparison on each data block of said chosen size.

21. The system according to claim 17, wherein the first request comprises first data resulting from application of a chosen cryptographic function to at least a chosen part of at least some of primary data defining said content, and said processor is further configured, before proceeding to said comparison, to apply said chosen cryptographic function to said received second data to produce processed data, and then to compare said processed data to said first data.

22. The system according to claim 20, wherein the first request further comprises a value defining offsets between each first data block and a chosen data block acting as a reference, and said processor is further configured to generate the second request further comprising said received offset values, and to apply said chosen cryptographic function to said received second data, arranged into data blocks of said chosen size and corresponding to said received offset values, to produce processed data blocks, and then to compare said processed data blocks to said first data blocks.

23. The system according to claim 17, wherein said first data comprises at least some of primary data defining said content.

24. The system according to claim 17, wherein said processor is further configured to use the predetermined timeout which is chosen to be smaller than an estimation of the minimal time which would be necessary to said second communication equipment for downloading said content from a third communication equipment and then transmit said downloaded content arranged into said second data to said auxiliary communication equipment.

* * * * *